US006550671B1

(12) United States Patent
Brown et al.

(10) Patent No.: US 6,550,671 B1
(45) Date of Patent: Apr. 22, 2003

(54) CASH REGISTER AND METHOD OF ACCOUNTING FOR CASH TRANSACTIONS

(75) Inventors: Michael Wayne Brown, Georgetown, TX (US); Rabindranath Dutta, Los Angeles, CA (US); Michael A. Paolini, Round Rock, TX (US); Newton James Smith, Jr., Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/062,345

(22) Filed: Jan. 31, 2002

(51) Int. Cl.[7] .............................................. G06F 17/60

(52) U.S. Cl. ...................................... 235/379; 235/380

(58) Field of Search ................................ 235/385, 380, 235/383, 375, 379, 441, 381, 494, 472.01; 705/21, 16; 194/206, 217, 207

(56) References Cited

U.S. PATENT DOCUMENTS

| | | | | | |
|---|---|---|---|---|---|
| 4,495,627 | A | | 1/1985 | Nishimura | 377/6 |
| 4,532,641 | A | | 7/1985 | Nishimura | 377/14 |
| 4,538,057 | A | | 8/1985 | Iwagami et al. | 235/379 |
| 4,594,664 | A | | 6/1986 | Hashimoto | 705/21 |
| 4,707,843 | A | | 11/1987 | McDonald et al. | 377/8 |
| 5,239,165 | A | * | 8/1993 | Novak | 235/375 |
| 5,595,264 | A | * | 1/1997 | Trotta, Jr. | 186/56 |
| 5,607,040 | A | * | 3/1997 | Mathurin, Sr. | 194/207 |
| 5,695,038 | A | * | 12/1997 | Keith et al. | 194/206 |
| 5,756,977 | A | | 5/1998 | Biss | 235/7 R |
| 5,918,720 | A | | 7/1999 | Robinson et al. | 194/206 |
| 5,944,163 | A | * | 8/1999 | Keith et al. | 194/206 |
| 5,975,275 | A | * | 11/1999 | Keith et al. | 194/217 |
| 6,062,481 | A | * | 5/2000 | Storch et al. | 235/494 |
| 6,131,718 | A | * | 10/2000 | Witschorik | 194/206 |
| 6,189,790 | B1 | * | 2/2001 | Walter | 235/383 |
| 6,325,290 | B1 | * | 12/2001 | Walter et al. | 235/472.01 |
| 6,386,448 | B1 | * | 5/2002 | Addy | 235/383 |
| 6,408,279 | B1 | * | 6/2002 | Mason | 705/16 |

* cited by examiner

*Primary Examiner*—Thien M. Le

(74) *Attorney, Agent, or Firm*—Cynthia S. Byrd; Jeffrey L. Streets; Streets & Steele

(57) ABSTRACT

A method of obtaining, recording and using the denomination and the serial number of bills received into cash registers from purchasers, and using computer automation to dispense other bills from the cash registers to make change. Enhanced accounting, security and efficiency for cash transactions is provided by electronically associating bills with information describing the purchases and, optionally, transmitting electronically this information to the purchaser. Optical character recognition is used to identify the denomination and serial number of each bill. Optionally, a cashier may enter a duress code into the register to initiate a silent alarm signal, identify the serial numbers of each bill dispensed under duress, or mark an invisible ink onto each bill dispensed under duress. The method also enables determining whether each bill received is counterfeit or stolen.

46 Claims, 8 Drawing Sheets

| NET CASH IN REGISTER | BILL DENOMINATION | BILL SERIAL NUMBER | DATE RECEIVED | TIME RECEIVED | PURCHASE DESCRIPTION | TOTAL | CURRENT CHANGE DUE | PUR-CHASER | ALERT |
|---|---|---|---|---|---|---|---|---|---|
| 301 | 302 | 303 | 304 | 305 | 306 | 307 | 308 | 309 | 310 |
| | | | | | | | | | |
| | | | | | | | | | |
| 335 | | | | | | | | | |
| 340 | 5 | H85469644B | 010823 | 0842 | MINTS | 0.85 | 4 | 2719432 | |
| 339 | (1) | B40591023W | 010823 | 0842 | | | 3 | " | |
| 338 | (1) | 108104582H | 010823 | 0842 | | | 2 | " | |
| 337 | (1) | K54661363E | 010823 | 0842 | | | 1 | " | |
| 336 | (1) | K01600492A | 010823 | 0842 | | | 0 | " | |
| 356 | 20 | AB22961609H | 010823 | 0845 | GRAPES | 3.71 | 16 | 2614943 | |
| 346 | (10) | K45243095B | 010823 | 0845 | | | 6 | " | |
| 341 | (5) | AB03022731C | 010823 | 0845 | | | 1 | " | |
| 340 | (1) | AG88514714A | 010823 | 0845 | | | 0 | " | |
| | | | | | | | | | |
| | | | | | | | | | |
| | | | | | | | | | |
| | | | | | | | | | |
| | | | | | | | | | |
| TOTAL | 5 | | | | | | | | |

30

FIG. 4

CASH REGISTER AND METHOD OF ACCOUNTING FOR CASH TRANSACTIONS

BACKGROUND OF THE INVENTION

1. Field of the invention

The present invention provides an improved cash register and method of accounting for cash transactions.

2. Description of the related art

Many businesses, especially those selling consumer goods, use cash registers, operated by cashiers, to facilitate purchases of goods or services by purchasers using currency, checks or transaction cards. Cash registers generally have a cash drawer that slides out at the appropriate time in the transaction to reveal a plurality of compartments, where each compartment is designed to accommodate one stack of bills of a common denomination. For example, there may be a compartment for $20 bills located next to a compartment for $10 bills which is, in turn, located next to a compartment for $5 bills which is, in turn, located next to a compartment for $1 bills. Coins are usually stored in a generally parallel set of coin compartments. Bills are manually placed in, or manually retrieved from, these compartments in the cash register as necessary to complete a transaction with a purchaser.

A modern cash register will also have many of the elements of a computer, including a microprocessor, for performing calculations such as adding the cost of individual items, calculating tax, discounts, coupon credits and, ultimately, the amount of change due to the purchaser. A keypad on the cash register may be used by the cashier to enter the costs of individual items and to determine the total amount owed by the purchaser for goods or services purchased. Alternatively, a bar code scanner may be used as a means for inputting the identification and cost of items to the computer. The total is displayed on a message display and bills and coins are tendered in payment by the purchaser. The amount of currency tendered by the purchaser is entered into the cash register by the cashier using the keypad. The cash register then calculates the difference between the amount of currency tendered by the purchaser and the total cost of the goods or services. The amount of change due to the purchaser is displayed on the message display, the cash drawer is opened, and the cashier manually removes the right combination of bills and coins from the cash drawer as necessary to make change to the purchaser in the amount displayed.

The cash register's computer generally records information for each transaction made using the cash register during a controllable time period. This recorded transaction data is used to determine total cash receipts for each cashier's shift for reconciling net receipts during that shift on that cash register. Businesses operating large numbers of cash registers, such as grocery stores, discount stores or department stores, generally observe very stringent security measures and safeguards to deter and prevent theft of cash. When a cashier's shift changes, the cash drawer is typically removed from the cash register and taken to a secure location so that the cash in the drawer can be counted and reconciled with the transaction data. This procedure requires that a new cash drawer be prepared in advance and placed in the cash register for use by the next cashier.

There are also systems that automatically dispense coins from a cash register without the necessity of having the cashier manually remove coins to make change to the purchaser. These systems dispense a combination of coins to make proper change to the purchaser along with the bills manually provided by the cashier.

One problem with existing methods of operating cash registers is that the methods rely heavily on the performance of cashiers who are, even with experience and training, prone to error, especially when tired or distracted. Substantial resources of time and personnel are expended on managing cashier shift changes, and on reconciling cash drawers with recorded transaction data. Another problem with existing methods is that, in most stores, a cash drawer opens to the cashier and to all others in the area of a cash register, and every transaction provides a tempting opportunity for theft. In addition, the fact that cash can be easily accessed by a cashier increases the likelihood that a criminal may force a cashier to access and surrender the cash. Violence against cashiers is a major concern, especially in convenience stores late at night.

Another problem with existing methods of operating a cash register is that information pertaining to cash transactions cannot be recorded and communicated to others without great inconvenience. For example, a purchaser must generally request, obtain and save a printed receipt, and then later retrieve the receipt and record transaction information in a written or computerized database that is usually located at the purchaser's residence or business. If the purchaser successfully obtains, receives and later retrieves the receipt, information pertaining to the amount and the nature of the goods purchased must be manually entered into the database for the information to be of much use or benefit. All of this takes a great amount of time and organization, thereby discouraging many purchasers from even attempting to track cash transactions.

Credit card, debit card and electronically funded transactions are more easily captured and transmitted in electronic form. Generally, credit card statements or bank account statements provide at least some transaction information, and this information is often available for downloading from the Internet into an accounting database by the purchaser. Some businesses issue optically scanable membership cards (e.g. having bar codes) that enable the computer to identify and track the transactions of each card-holder/purchaser, and this information is used by the business in targeted marketing and consumer incentive programs. In this situation, information regarding cash transactions by the purchaser can be provided to the purchaser through the Internet in a form compatible with preferred accounting software for personal computers so long as the membership card is presented and scanned at the time of the transaction.

What is needed is a cash register that does not require exposing cash in the register to the cashier and to others in the area of the cash register at the time of the transaction. What is needed is a method of accounting for cash transactions that eliminates the necessity for exchanging and reconciling cash drawers upon each cashier shift change. What is needed is a method of operating a cash register that enables automatic real-time reconciliation of each register. What is needed is a method of accounting for cash transactions that reliably provides the business operating the cash register with cash inventory information and the purchaser with budgeting information without lost time for repeated reconciliations of cash balances, re-entrance of data and tracking of receipts.

It would be desirable if the method would be compatible with existing cash registers, computers, servers and modems generally used by businesses. It would also be desirable if the method would be easily integrated to work with existing accounting software, the Internet and existing forms of paper currency. Furthermore, it would be desirable if the method enabled the detection of counterfeit or stolen bills.

SUMMARY OF THE INVENTION

The present invention provides a method comprising the steps of optically scanning currency having a serial number, as it is being deposited into a cash register, identifying the serial number for each item of the scanned currency, recording the serial numbers in a database, dispensing currency from the cash register in response to an input command, and updating the database of currency serial numbers to reflect currency deposits into and withdrawals from the cash register. During the scanning of currency, the system is able to identify the denomination of each item of the scanned currency. Preferably, the currency deposited and currency dispensed is associated with a given transaction. The method may also include recording a purchaser identification code in the database in association with each given transaction or recording a product or service identification in the database in association with each transaction. In one embodiment, the method may include transmitting a transaction report to an electronic address associated with the purchaser identification code, for example wherein the transaction report comprises the net amount of currency deposited and the product or service associated with the transaction. Finally, the method may include determining the net cash receipts into the register as currency deposited into the register, less currency dispensed from the cash register, wherein the net cash receipts may then be provided for use in an accounting program.

One aspect of the invention provides a method comprising: maintaining a database representing the denomination of each bill within the cash register; identifying, using a cash register, an amount due to be paid by a purchaser for goods or services; optically scanning a first bill deposited into the cash register; determining the denomination of the first bill received into the cash register; determining an amount of change due to the purchaser; identifying from the database a second bill within the cash register having a denomination appropriate for dispensing as change; dispensing the second bill from the cash register; and updating the database to reflect deposit of the first bill into the register and dispensing of the second bill from the register. It may also be possible to detect counterfeit currency using either the scanned image data or a separate process as described herein. Furthermore, the method may further include automatically providing notification that the cash register should be replenished with one or more bill or coin denomination. In the absence of a desired denomination, the method may include automatically selecting another suitable denomination for use in making change.

The invention further provides a computer program product comprising scanning instructions for optically scanning currency having a serial number as it is being deposited into a cash register, identifying instructions for identifying the serial number for each item of the scanned currency, recording instructions for recording the serial numbers in a database, dispensing instructions for dispensing currency from the cash register in response to an input command, and updating instructions for updating the database of currency serial numbers to reflect currency deposits into and withdrawals from the cash register. Preferably, the computer program product will comprise identifying instructions for identifying the denomination of each item of the scanned currency. In a preferred embodiment, the computer program product further comprises one or more of the following instructions: associating instructions for associating the currency deposited and currency dispensed with a given transaction, recording instructions for recording a purchaser identification code in the database in association with each given transaction, transmitting instructions for transmitting a transaction report to an electronic address associated with the purchaser identification code, and recording instructions for recording a product or service identification in the database in association with each transaction. Furthermore, the computer program product may include determining instructions for determining the net cash receipts into the register as currency deposited into the register less currency dispensed from the cash register, and providing instructions for providing the net cash receipts for use in an accounting program.

In addition, the invention provides a system for managing transactions involving currency. The system comprises scanning means for optically scanning currency having a serial number as it is being deposited into a cash register, identifying means for identifying the serial number for each item of the scanned currency, recording means for recording the serial numbers in a database, dispensing means for dispensing currency from the cash register in response to an input command, and updating means for updating the database of currency serial numbers to reflect currency deposits into and withdrawals from the cash register. Preferably, the system will include one or more of the following: identifying means for identifying the denomination of each item of the scanned currency, associating means for associating the currency deposited and currency dispensed with a given transaction, recording means for recording a purchaser identification code in the database in association with each given transaction, transmitting means for transmitting a transaction report to an electronic address associated with the purchaser identification code, recording means for recording a product or service identification in the database in association with each transaction, determining means for determining the net cash receipts into the register as currency deposited into the register less currency dispensed from the cash register, and providing means for providing the net cash receipts for use in an accounting program.

BRIEF DESCRIPTION OF THE DRAWINGS

FIG. 4 is an exemplary structure of a database created and maintained in accordance with the present invention.

DETAILED DESCRIPTION

Figure 1A:
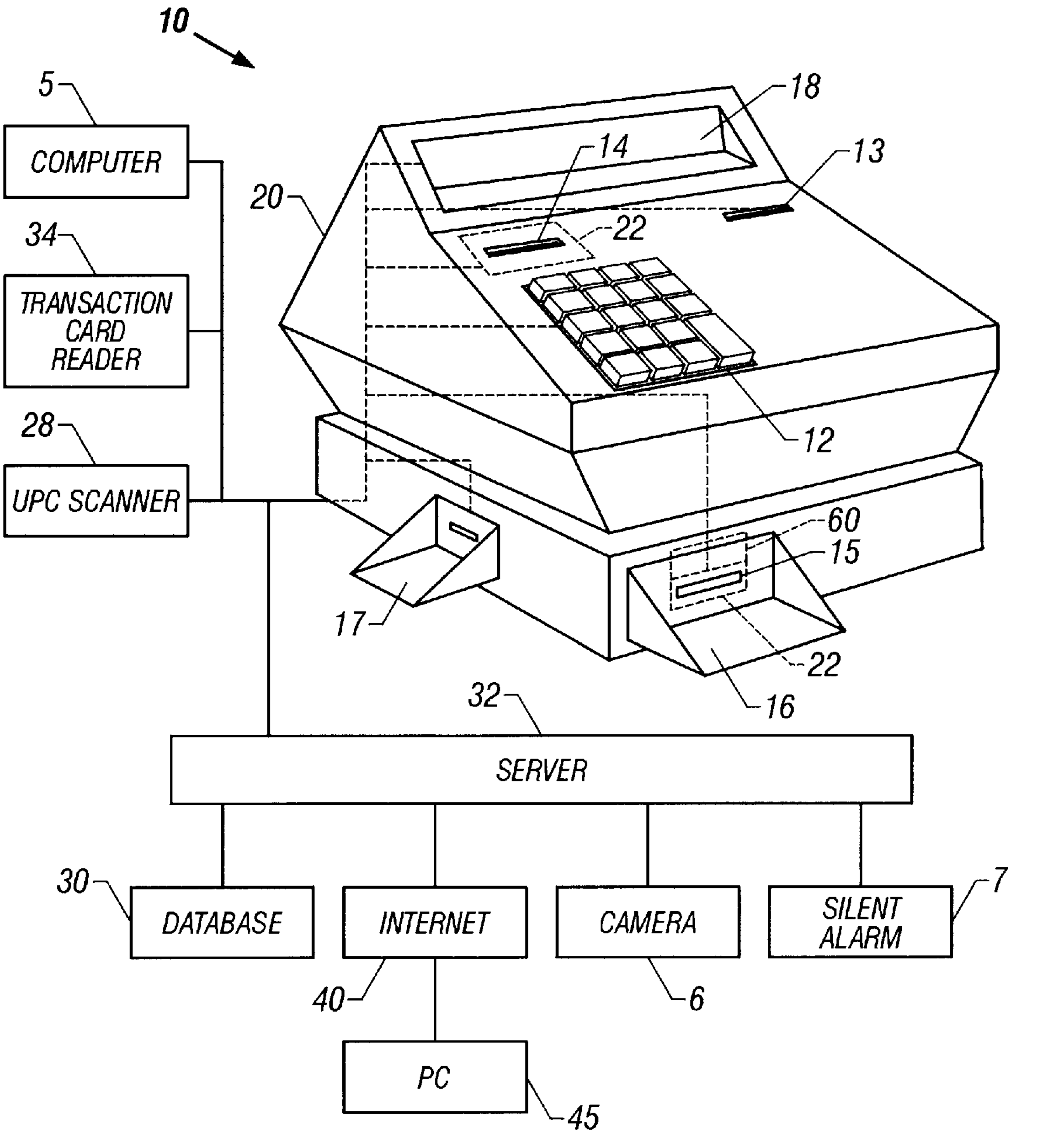
FIG. 1A is a schematic diagram of an improved cash register for use in accordance with the present invention.

The present invention provides an improved cash register and method of operating a cash register that accounts for both cash received into and dispensed from a cash register. The present invention prevents or reduces the chances that money will be lost, mislaid or stolen. The present invention also facilitates the integration of cash registers with computerized accounting programs, and with the Internet. Accordingly, the present invention may be used by businesses to operate cash registers and by purchasers to account for cash transactions. The present invention eliminates the need to reconcile cash each time a cashier operating a cash register changes shifts, and it eliminates the need to provide access codes and keys to cashiers or managers for use in exchanging cash drawers.

The method of operating a cash register of the present invention includes an automatic bill receiving and dispensing system that uses OCR technology to scan bills tendered by a purchaser and fed into the cash register. The authenticity of each bill is confirmed, and the serial number and denomination of each bill are scanned and electronically recorded in a database. Confirming authenticity includes detecting counterfeit bills using the scanned image of the bill or other means, such as ultraviolet detection, watermark detection, or magnetism detection. The serial number and denomination of each bill can be electronically associated with information pertaining to the transaction in which each bill is received into or dispensed from the cash register. Accordingly, a single record in the transaction database may include the date, time and location of the transaction, the cost and description of each product or service purchased, the denomination and serial number of each bill received in payment for goods or services or dispensed as change, and other information available from automated inventory systems, UPC systems and consumer incentive programs, such as those using scanable bar codes, identification cards or electronically detectable tags or transponders. It should be recognized that although the present invention focuses on the handling of bills, the invention is preferably used in combination with known procedures and equipment for dispensing coins so that the entire dispensation of change may be automated, whether the change involves bills, coins or combinations thereof.

Similarly, the method of the present invention is compatible with transactions where a check or transaction card, such as a credit card or debit card, is used as the payment method and cash is to be provided back to the purchaser. Identifying information obtained either by scanning a check or reading a transaction card may be recorded in the database and associated with information pertaining to the transaction in which the check or transaction card was tendered. In all other respects, the present method provides these transactions with the same abilities as described herein for transactions paid for with cash.

Optionally, the present invention also provides a method of marking bills dispensed from a cash register when the cashier is under duress, wherein the bills are marked with special invisible ink that can only be seen under certain types of light, such as ultraviolet light. The markings on the bills dispensed from the cash register may include transaction specific information. Preferably, cashiers may indicate or signal that they are under duress by entering a duress code or PIN into the cash register keypad, or some other method such as a foot switch.

Modern paper cash, or bills, incorporate many features that are designed to be difficult to replicate, even with advanced printing and imaging techniques. Serial numbers are widely used to uniquely mark each bill so that it can be distinguished from all others, including those of the same denomination. Serial numbers on bills are of a standardized size, font, format and location on the bill, and can be quickly scanned, read and recorded using optical character recognition technology. Existing machines are capable of handling, counting and scanning bills at extremely high rates of speed. Furthermore, all bills issued by the United States Treasury since early 1996 have a unique combination of eleven numbers and letters printed twice on the front side of the bill, thus making the unique combination more subject to fast and easy identification using optical recognition technology.

The method of the present invention uses an optical character recognition (OCR) device to scan and record in a database, and in some cases transmit to others, the denomination and serial number of one or more bills tendered by or dispensed to a purchaser in a cash transaction. The method of the present invention may also use OCR or bar code technology, passwords or passcodes or electronically detectable transponders to read and record information identifying the purchaser. This information may be electronically associated with other data obtained from the bills.

The method of the present invention enables a business to automatically determine the amount of money received into and dispensed from a cash register during any given time period. This determination is done by adding the denominations of all bills received into and retained within the cash register during a selected time period, and subtracting from that amount the denominations of bills that were dispensed from the cash register during the selected time period. Finally, the net balance of coins received into and dispensed from the register, calculated in much the same manner as given above for bills, is applied to adjust the net balance of bills to determine the net amount of money received into the cash register during the selected time period.

The method of the present invention enables efficient, reliable and low cost accounting of cash expenditures by a purchaser. The purchaser may install and maintain a personal cash inventory database on a home or business personal computer. The personal cash inventory database tracks the denominations of bills received by and dispensed by the purchaser in the course of cash transactions and banking transactions by downloading data from electronic messages, such as e-mail, sent by businesses and banks having a system for tracking bills received from and dispensed to identified purchasers. The purchaser may be identified by the participating business or bank using account numbers assigned to discount or membership accounts, bank accounts, debit cards or credit cards, where the purchaser's electronic address is given by the purchaser in advance or at the time of the transaction.

The present invention also provides a method of recording the denominations and serial numbers of bills dispensed from a cash register under duress to facilitate capture and criminal prosecution of the thief. The recorded serial numbers associated with the stolen bills maybe provided to law enforcement authorities. Alternatively, widespread use of bill-scanning cash registers as disclosed herein would facilitate transmission of the serial numbers to a central server that each cash register could access upon receiving and scanning additional bills to determine whether the bills were stolen.

FIG. 1A is a schematic diagram of an improved cash register for use in accordance with the present invention. The cash register 10 comprises an enclosure 20, a keypad 12, a bill receiving port 14, a bill dispensing port 15, a bill dispensing tray 16, a coin receiving port 13, a coin dispenser 17, and a display 18. Both the bill receiving port 14 and the dispensing port 15 are provided with scanners 22 to facilitate scanning of the bills as they are received and/or dispensed in accordance with one or more embodiments of the invention. Further, the dispensing port 15 is provided with a printer or bill marker 60 that marks the bills with invisible ink upon command.

The register 10 also includes a computer 5 electronically coupled to the keypad 12, bill receiving unit 14, bill dispensing unit 15, coin receiving port 13, coin dispensing unit 17, display 18 and bill scanners 22. The cash register 10 may also be electronically coupled to and receive data from a UPC scanner 28 and a transaction card reader 34. The computer 5 is preferably electronically coupled to a server 32 having access to a database 30 and, optionally, to the Internet 40, such as for communicating a transaction report to a customer's PC 45. For purposes of implementing certain security aspects of the present invention, the server 32 will preferably be in electronic communication with a camera 6 and a silent alarm 7.

Figure 1B:
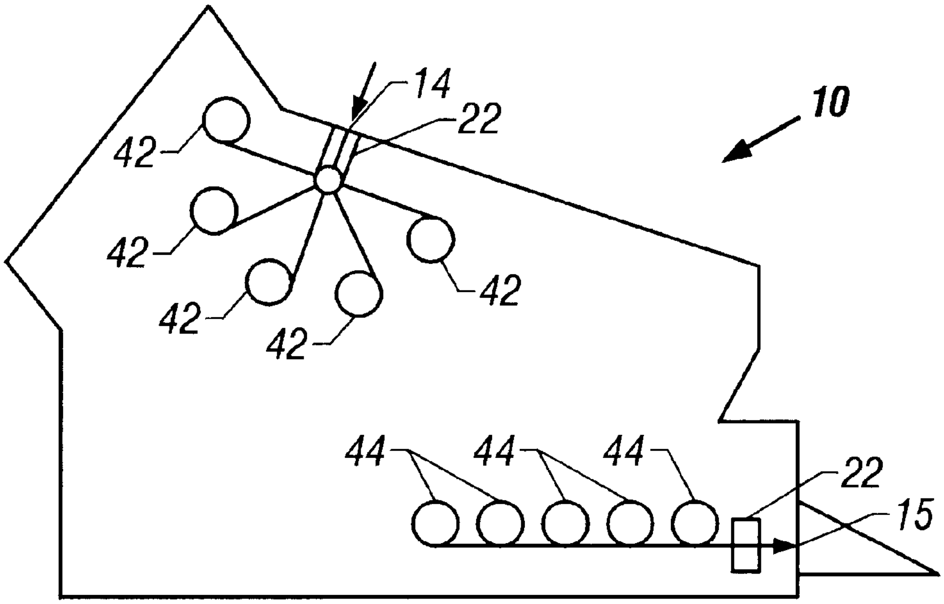
FIG. 1B is a schematic side view of the cash register having a single bill receiving unit that includes a scanner and one or more bill receiving bins.

Referring briefly to FIG. 1B, a schematic side view of the cash register 10 illustrates an embodiment of the invention in which a single bill receiving unit 14 includes the scanner 22 and one or more bill receiving bins 42, perhaps one bin per denomination of bill such as $1, $5, $10, $20 and the like. It is not necessary, in regard to FIG. 1B, that the bills received from the purchaser be sorted into separate bins 42, but rather a single bin 42 may be used to collect bills of all denominations. As a practically matter, the bills would later need to be taken out and sorted, either manually or automatically. The bill dispensing unit 15 includes a scanner 22 and bill dispensing bins 44. As shown in FIG. 1B, the cash register 10 would collect bills received from customers into bin 42 and payout change in bills from different bins 44. The bills dispensed as change would be provided and replenished as necessary, for example by the head cashier. While this arrangement will require more cash on hand, the dispensing of bills that are not torn, wrinkled or dirty will make the system work better and meet customer expectations from a more ATM-like cash register.

Figure 1C:
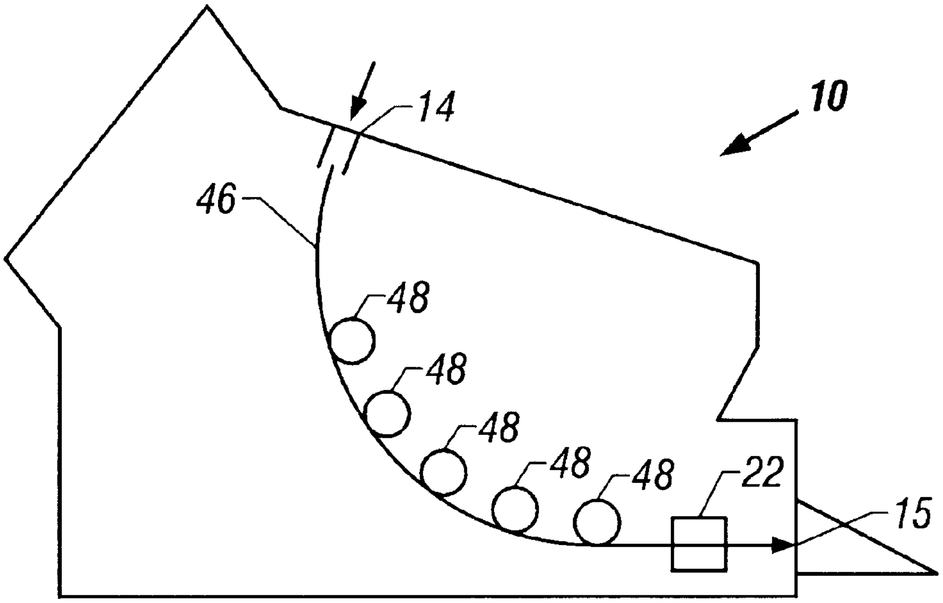
FIG. 1C is a schematic side view of the cash register having a single bill receiving unit that includes a scanner, a single bill dispensing unit that includes a scanner, and a path providing transportation of bills both from the receiving unit to the bins and from the bins to the dispensing unit.

Referring briefly to FIG. 1C, a schematic side view of the cash register 10 illustrates another embodiment of the invention in which a single bill receiving unit 14 includes a scanner 22, a single bill dispensing unit 15 includes a scanner 22, and there is a path 46 providing transportation of bills both from the receiving unit 14 to bins 48 and from the bins 48 to the dispensing unit 15. The advantage of this embodiment relative to that of FIG. 1B is that bills received can be used to make change in later transactions, thereby reducing the necessary amount of cash on hand. However, the disadvantage relative to that of FIG. 1B is that the entire system must be able to reliably handle used bills in various states of condition.

For purposes of illustration only, the method of the present invention is described in the context of the purchase of goods in a grocery store. The method is equally applicable to payment for other goods or services, for fare, toll, tickets or entry into a restricted access area, for activation of a machine or otherwise.

When a purchaser brings items for purchase to the check-out counter of a grocery store, the Universal Product Code (UPC) on a label on the item, or on a package in which the item is sold, is optically scanned using a UPC scanner 28. The scanned UPC code is electronically communicated to the computer 5. Optionally, price labels or UPC codes are read by a cashier who manually enters the prices or codes into the computer 5 using the keypad 12 on the cash register 10. The information pertaining to each item is generally available to the computer 5 by cross-referencing the UPC bar code with UPC information, such as the price and description of each item, stored in database 30. Cross-referencing the UPC code enables the computer 5 to determine the price and description of each item and to automatically update inventory records. The computer 5 publishes the price and description on the display 18 of the cash register 10. The prices of multiple items are totaled and applicable taxes are determined using the computer 5, and the total amount of payment due from the purchaser is provided on the display 18. The display 18 may be any of a variety of visual displays including a video monitor, liquid crystal display (LCD) or light emitting diode (LED).

The cashier reads the display 18 and feeds bills as necessary into the receiving port 14 until the display 18 indicates that sufficient bills have been entered to cover the total cost of the items being purchased. The bill scanner 22 automatically scans each bill received into the cash register 10 at the receiving port 14 to determine and electronically communicate to the computer 5 the denomination 52 and serial number 53 of each scanned bill 50 (See FIG. 3). Preferably, the accumulated amount of money received into the receiving port 14 is continually calculated, updated and published on the display 18. When the accumulated amount of money received into the receiving port 14 equals or exceeds the total amount due or, optionally, when the cashier presses a key on the keypad 12 to signal the computer 5 that the purchaser is finished depositing bills, the computer 5 determines the amount of change due to the purchaser (as the total cost of all items plus tax, subtracted from the total amount of bills and coins tendered and received into the cash register 10), publishes that amount on the display 18, dispenses bills into the dispensing tray 16, and dispenses coins into the coin dispenser 17. Alternatively, the purchaser may feed in the bills to remove any doubt as to the amount of cash entered into the register 10, perhaps using a port near the coin dispenser 17. Further still, the bills received from a purchaser during a single transaction could be maintained clearly visible within the register, such as in a single-transaction queue, to avoid disputes over the exact amount tendered.

Figure 2A:
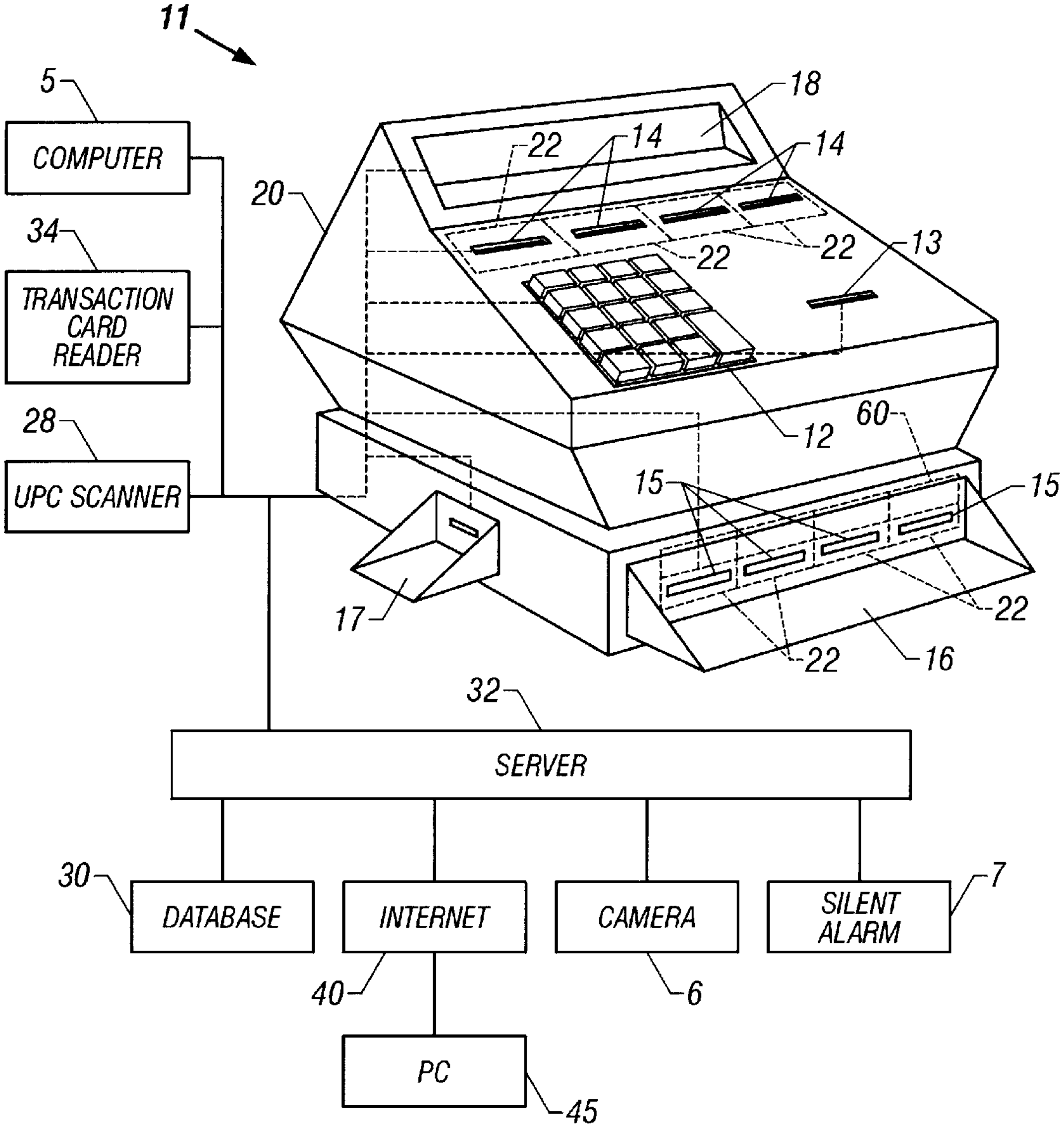
FIG. 2A is a schematic diagram of an improved cash register having a plurality of cash receiving units and a plurality of cash dispensing units.

FIG. 2A is a schematic diagram of an improved cash register 11 for use in accordance with the present invention, the register 11 having a plurality of bill receiving units 14 and a plurality of bill dispensing units 15. Other than the plurality of bill receiving and dispensing units, the register includes the same components and operates in the same manner as that shown in FIG. 1A. Each of the plurality of bill receiving units 14 may be dedicated to receiving a particular denomination of bill and each of the plurality of bill dispensing units 15 may be dedicated to dispensing a particular denomination of bill.

Figure 2B:
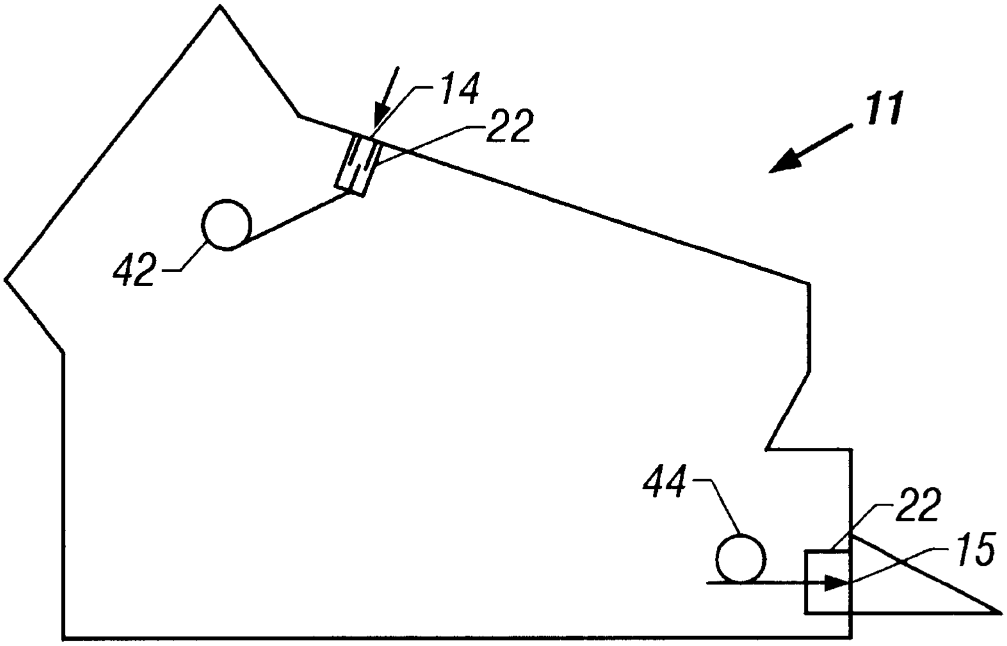
FIG. 2B is a schematic side view of the cash register having a dedicated cash receiving bin for each of the cash receiving units and a dedicated cash dispensing bin provided for each of the cash dispensing units.

Referring briefly to FIG. 2B, a schematic side view of the cash register 11 illustrates an embodiment of the invention in which a dedicated cash receiving bin 42 is provided for each of the bill receiving units 14 and a dedicated cash dispensing bin 44 is provided for each of the bill dispensing units 15. While separate receiving and dispensing bins are utilized, the fact that there is one receiving bin and one dispensing bin per denomination of bill allows each mechanism to be simpler.

Figure 2C:
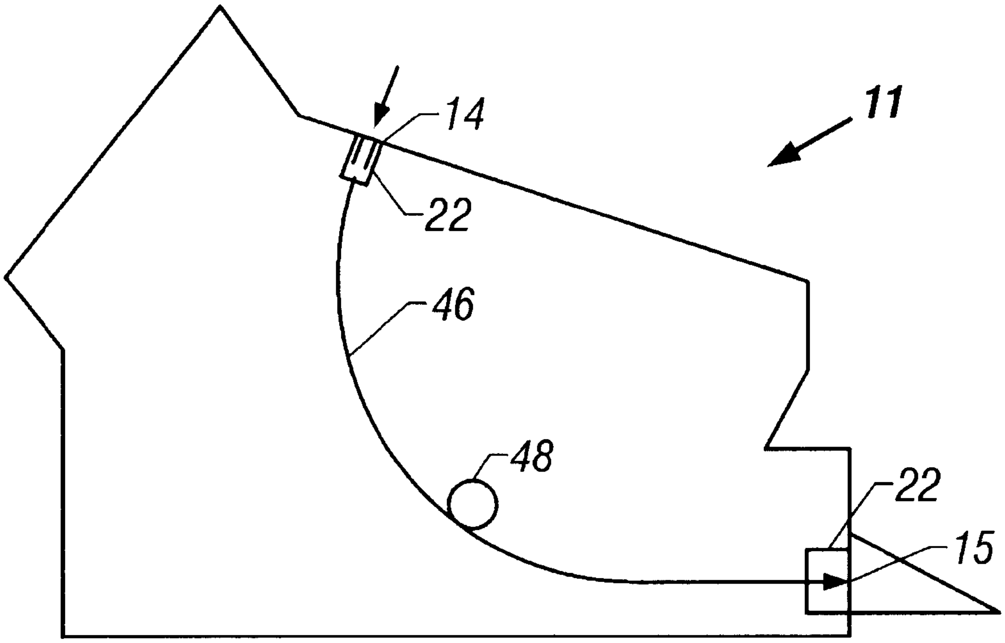
FIG. 2C is a schematic side view of the cash register having a bill receiving unit that includes a scanner, a bill dispensing unit that includes a scanner, and a path providing transportation of bills both from the receiving unit to the bins and from the bins to the dispensing unit.

Referring briefly to FIG. 2C, a schematic side view of the cash register 11 illustrates another embodiment of the invention in which each bill receiving unit 14 includes a scanner 22, each bill dispensing unit 15 includes a scanner 22, and there is a path 46 providing transportation of bills both from the receiving unit 14 to bin 48 and from the bin 48 to the dispensing unit 15. The advantage of this embodiment relative to that of FIG. 2B is that bills received can be used to make change in later transactions, thereby reducing the necessary amount of cash on hand. However, the disadvantage relative to that of FIG. 2B is that the entire system must be able to reliably handle used bills in various states of condition. It should be noted that the system shown in FIG. 2C is duplicated for each pair of receiving and dispensing units 14, 15 shown in FIG. 2A.

Figure 3:
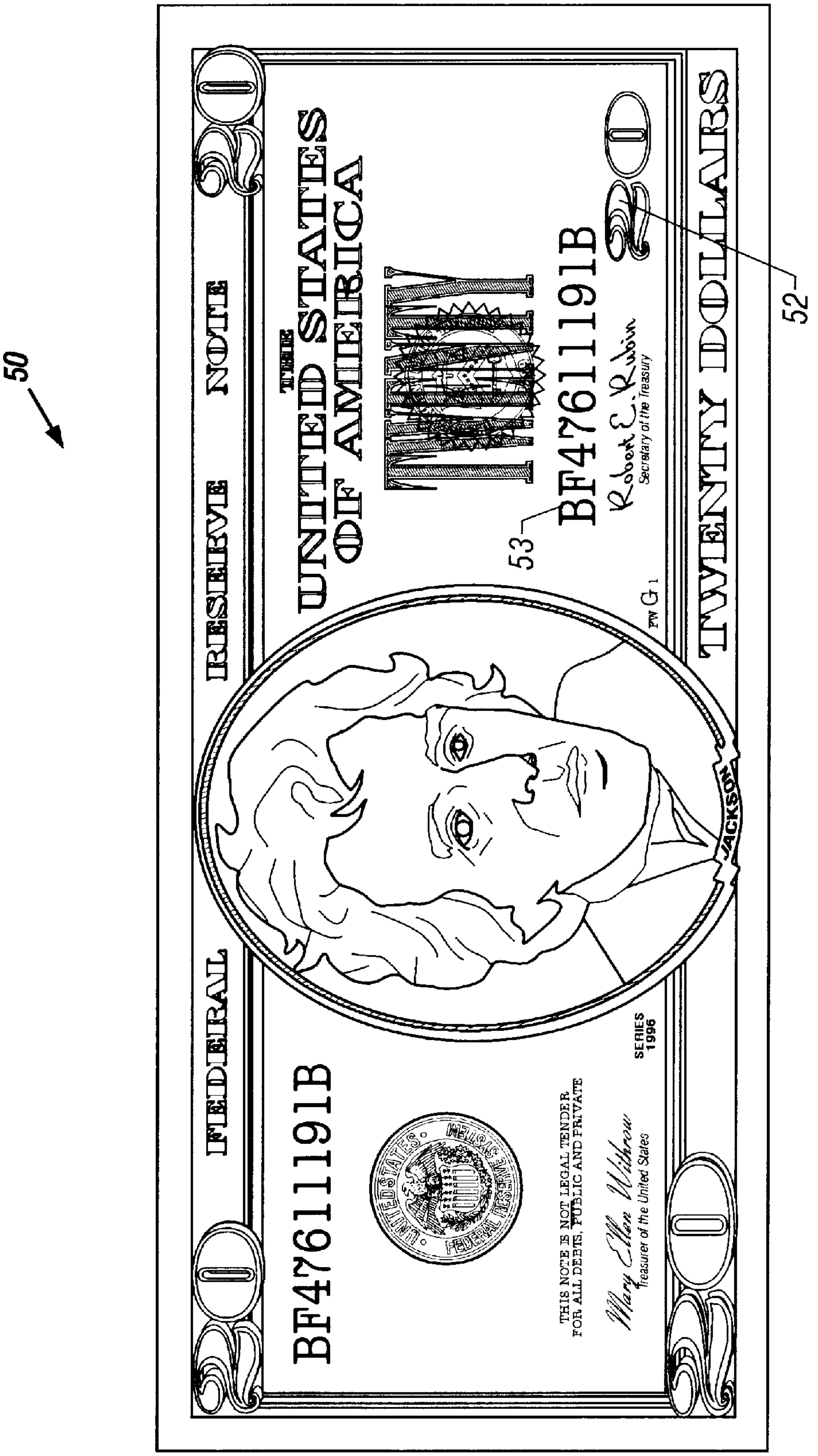
FIG. 3 is a typical U.S. Treasury bill having a serial number and a denomination.

FIG. 3 shows an exemplary $20.00 bill 50 issued by the U.S. Treasury Dept. The serial number 53 and the denomination 52 are prominently displayed at two and four locations on the bill 50, respectively. This bill may also possess properties that may be used to determine its authenticity, such as properties that are detectable through ultraviolet detection, watermark detection, or magnetism detection.

FIG. 4 is one structure of a database created and maintained in accordance with the present invention. The determination of the denomination and serial number of each bill received into a receiving port 14 enables the computer 5 to continually update a cash inventory record maintained in database 30, for example having fields 301–310. In this embodiment, the database 30 maintains the net cash in the register at all times in field 301, the denomination of the bill being received or dispensed (indicated by parentheses) in field 302, the bill serial number in field 303, the date and time the bill was received or dispensed in fields 304 and 305, a purchase description in field 306, a total cost of the purchase in field 307, the current amount of change due (showing only bills due for illustration purposes) in field 308, the identification number of the purchaser in field 309, and any alert codes that maybe entered during the transaction in field 310. The computer 5 tracks the denomination and serial number of each bill tendered by the purchaser and received into the cash register, and of each bill dispensed by the cash register to make change to the purchaser. Bill tracking by denomination facilitates accounting for the business operating the cash register and for the purchaser, as is described in more detail below.

For example, FIG. 4 illustrates that a $5 bill was received from purchaser "2719432" on Aug. 23, 2001 at 8:42 a.m. to purchase "mints" at a total cost of $0.85. Since the register previously contained $335, the receipt of $5 brought the total to $340 dollars. The current change due in field 308 is calculated to be $4 (coin change is neglected in this example, but would be automatically dispensed also). The next four lines in the database 30 show the automatic dispensing of four ($1) bills that reduce the net cash in field 301 down to $336. Note that the serial number and denomination of each bill dispensed is recorded in field 303. Should an alert code have been entered during the transaction, the serial number of the bills dispensed would be readily known and available and the bills could be marked. Next, a $20 bill was received from purchaser "2614943" on Aug. 23, 2001 at 8:45 a.m. to purchase "grapes" at a total cost of $3.71. Because the change due in field 308 is determined to be $16 ($0.29 in coins also being automatically dispensed), the database reflects the $10 bill, $5 bill and $1 bill dispensed. Each bill received from the purchaser in payment for the item described in the purchase description field 306 is associated in the database 30 with that particular item and that purchaser using the purchaser designation code stored in the purchaser field 309. Upon receiving the $20 bill into the cash register, the total amount of cash in the cash register was determined and updated in field 301 as $356 to provide a continuously accurate amount of cash in the cash register. This was accomplished by adding the bills received (and subtracting the bills dispensed) to the previous cash balance in field 302. Optionally, the intermittent or periodic updating in database 30 of the net amount of cash in the cash register may be done, for example, upon shift changes by the cashiers.

Figure 5A:
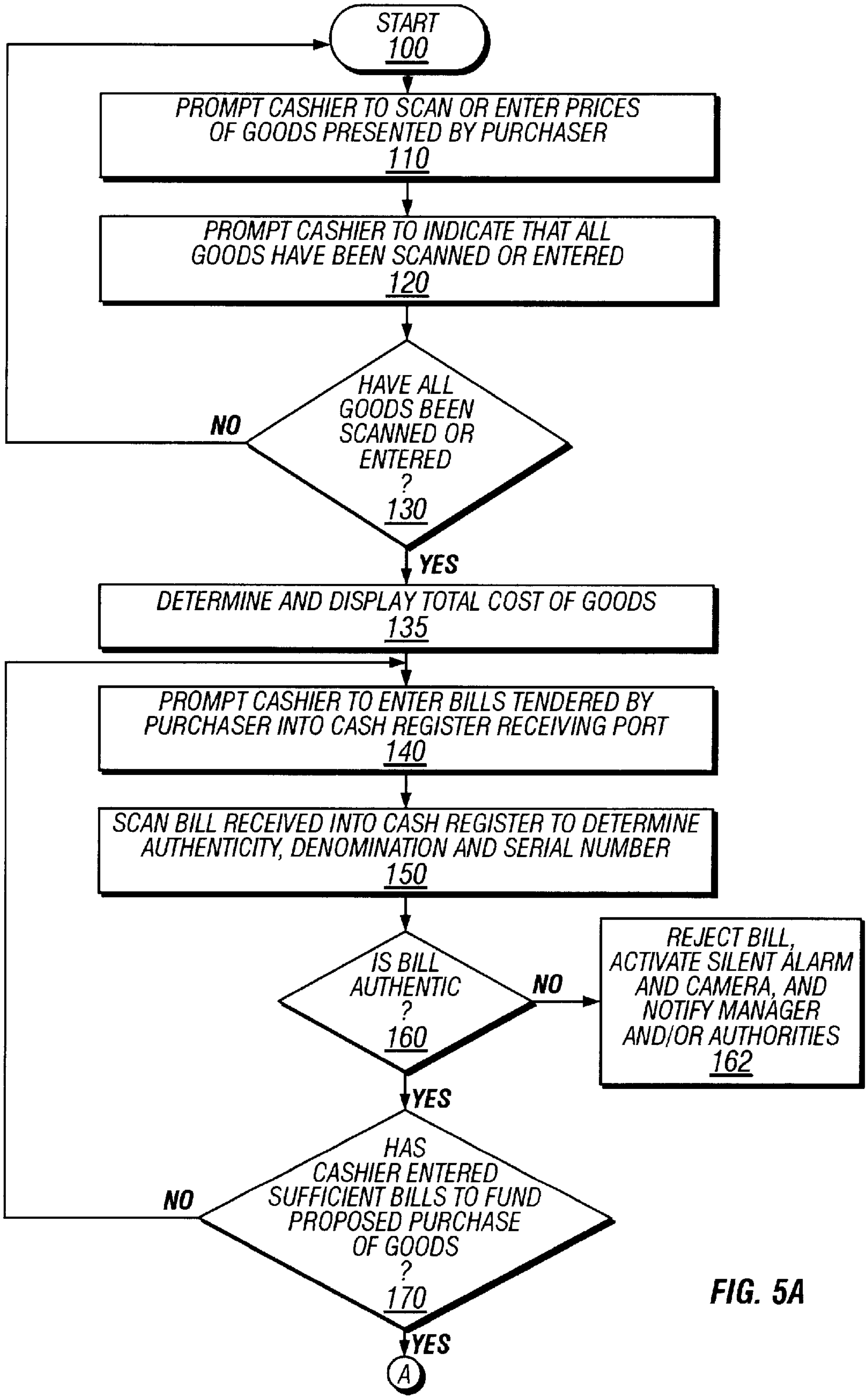
FIGS. 5A–B provides a flowchart of a method that may be executed on the cash register of FIG. 1 or FIG. 2.

FIG. 5A is a flowchart of a method of operating the cash register of the present invention. The method starts at step 100 when the purchaser presents the desired goods to the cashier at the cash register. In step 110, the cash register is in standby mode prompting the cashier to begin scanning the UPC label on each purchase or item using the UPC scanner 28. The cashier continues to scan the UPC label of each purchase or item until all goods have been scanned and then, in step 120, the computer prompts the cashier to press a key on the keypad 12 to indicate that all goods have been scanned. The computer 5 prompts the cashier to confirm that all goods have been scanned in step 130 and, if the cashier enters an affirmative reply, then in step 135 the computer 5 electronically displays the total cost of the goods, including all applicable taxes, on the display 18, and prompts the cashier, in step 140, to begin entering bills into the receiving port 14 of the cash register. In step 150, the bill scanner 22 scans the first bill to determine the authenticity, denomination 52 and serial number 53. In step 160, the computer 5 determines if the first bill is not authentic, i.e. is counterfeit or has a serial number on a listing of stolen bills. If the bill is not determined by the computer 5 to be authentic, the computer 5 activates a silent alarm 7 to notify store managers and police authorities, and a surveillance camera 6 to record the likeness and actions of the purchaser providing the counterfeit bill in step 162. If the bill is authentic then, in step 170, the computer 5 compares the denomination 52 of the first bill to the total cost of the goods displayed in step 135 to determine whether sufficient bills have been received into the cash register to fund the purchase. If sufficient bills have not been entered, the computer 5 returns to step 140 and prompts the cashier to enter additional bills. If the computer 5 determines that sufficient bills have been entered to fund the purchase then the process continues to FIG. 5B.

Figure 5B:
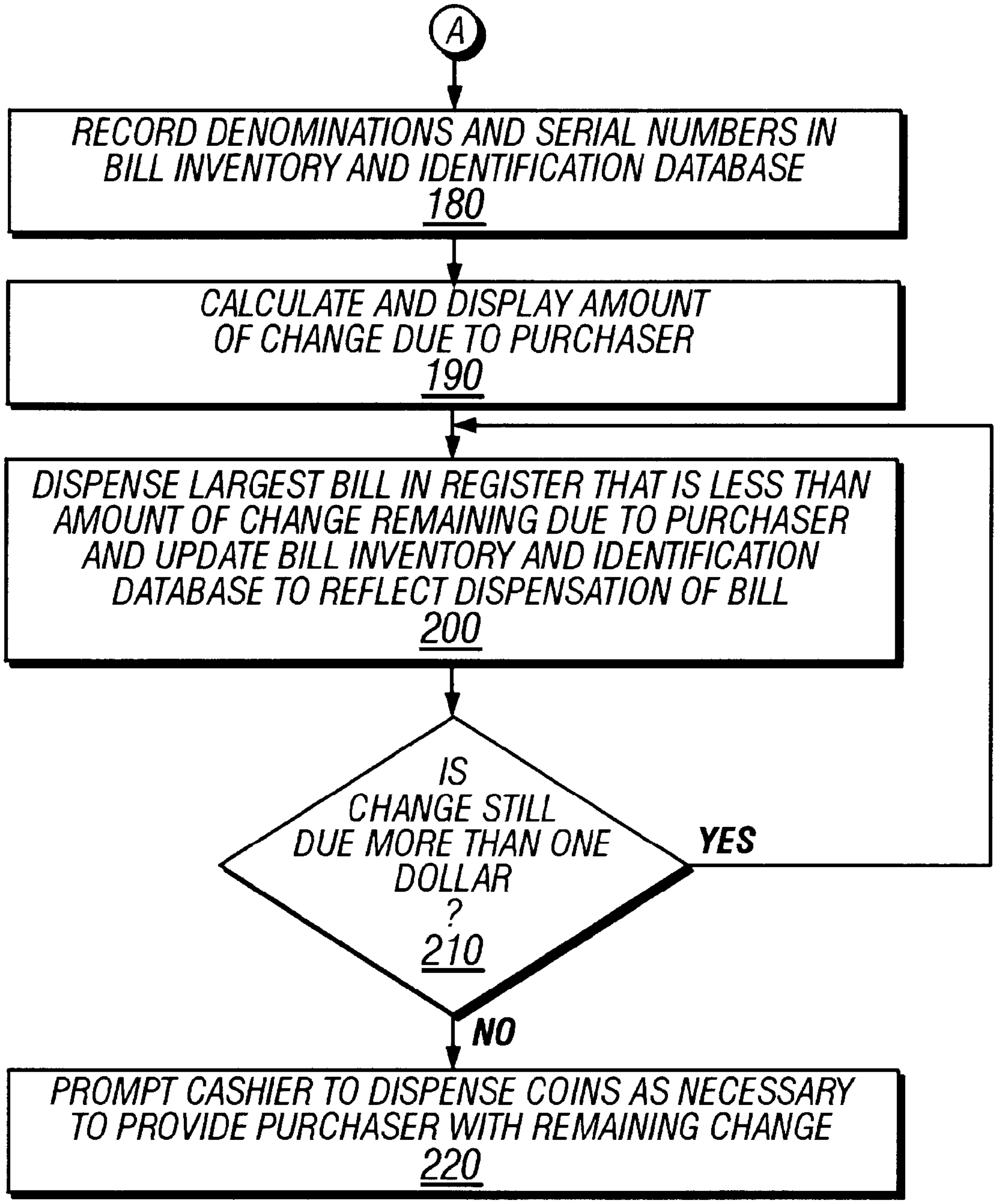

In step 180 of FIG. 5B, the computer 5 records the denominations 52 and serial numbers 53 of bills received into the cash register during the transaction in the bill inventory database 30 (depicted in FIG. 4) and, in state 190, the computer 5 calculates and displays the amount of change due the purchaser. In step 200, the cash register dispenses to the purchaser the largest denomination of bill in the cash register that is less than the amount of change due the purchaser and, in step 210, the computer determines whether the remaining amount of change due the purchaser (the originally determined amount of change due displayed in step 190 less the cumulative amount of the denominations of bills dispensed as change to the purchaser) is more than one dollar. If the remaining amount of change due to the purchaser is more than one dollar, then the computer 5 returns to step 200 and again dispenses the largest bill in the cash register that is less than the amount of change due to the purchaser. This iterative process continues until the amount of change remaining due to the purchaser is less than one dollar and, in step 220, the computer 5 prompts the cashier to make the remaining amount of change due to the purchaser using coins. Preferably, coins may be dispensed automatically.

The cash register of the present invention may be integrated with other methods of tracking purchasers. Some businesses may issue discount or membership accounts to their customers, usually facilitated with cards or key ring tags bearing a bar code, or electronically detectable transponder and issued to the purchaser for use at the time of transactions with that business. The cards or keyring tags are scanned and read using an OCR scanner, and the information provided identifies the customer who is the discount or membership account holder. Identification is generally made through the same method used for identifying an item using a UPC code; that is, an identifying bar code is read and the computer cross-references the identifying bar code with the corresponding account holder. The identifying codes and account holders are cross-referenced using records stored in database 30 or another database. Identifying the account holder who is purchasing items enables the business to automatically track purchases made by that customer using the identifying bar code (or electronically detectable transponder) so long as the bar code is scanned at the time of the transaction. Transaction information including the date, time, location and purchaser, may be electronically associated with the denomination and serial numbers of bills received from that purchaser, and that information maybe recorded in database 30. Optionally, the business may issue electronically detectable transponders to its customers/ account holders which, when scanned and detected at the time of the transaction, provide information to the computer 5 which can be associated with bills received or dispensed to the purchaser in connection with the transaction.

Optionally, included among the account holder identification information recorded in the database 30 is an electronic address for the purchaser. The purchaser's electronic address is provided by the purchaser upon applying for the discount or membership account. The availability of the purchaser's electronic address enables the business operating the cash register to provide account information to the purchaser by electronic communications using the Internet. Information that can be provided to the purchaser may include any or all of the transaction information recorded in the database 30, including the amount of money spent by the purchaser at the business within any given time period or upon any specific transaction, the specific items purchased by the purchaser at each transaction, the denominations and serial numbers of bills received by the cash register receiving port at each transaction, and the denominations and serial numbers of bills dispensed to the purchaser by the cash register in making change at each transaction. This information can be downloaded from the Internet 40 into a personal computer 45 used by the purchaser, and it can be used by the purchaser to manage cash transactions and in surveillance of purchases and cash transactions by family members or dependents. This information can also be stored in a personal financial manager, such as QUICKEN (A trademark of Intuit Corporation).

The method of the present invention enables businesses to automate reconciliation of cash received into and dispensed from the cash register. During a cashier shift change, the replacement cashier can simply "sign in" by entry of a unique employee code using the keypad 12. The computer 5 will cross-reference the employee code entered by the cashier with authorized employee codes recorded in database 30. Only if the employee code entered by the cashier is among the authorized codes will the computer 5 enable the cash register to accept or dispense bills or to otherwise be used for transactions. Optionally, the computer 5 may annotate all records of transactions performed using the cash register with the employee code entered by the employee. Optionally, the employee code may be entered remotely by management and communicated to the computer 5 by the server 32.

The present invention may also provide for enhanced security and protection against counterfeit bills and against theft. Upon receiving bills into the receiving port(s) 14, the bills are optically scanned using the bill scanner 22 and checked for authenticity at the same time that the serial numbers and denominations are read and recorded in the database 30. In the event that a bill should be in such a form as to fail authentication by the bill scanner 22 or is identified as a stolen bill, then the computer 5 activates a silent alarm 7 and a surveillance camera 6 to record the scene of the cash register receiving and scanning the counterfeit or stolen bill. Optionally, the camera may take a photograph of the person tendering the counterfeit bill and electronically transmit the photograph to authorities or security personnel, such as those posted at exits to the building. Wrinkled or damaged bills can be manually accepted by the cashier or manager.

Similarly, in the event that a thief instructs a cashier to dispense cash from the cash register under threats of harm, the cashier may enter a duress code or PIN using the keypad 12, or other methods, such as a foot switch. Upon receiving entry of the duress code, the computer 5 communicates the entry of the duress code to the server 32 that activates the silent alarm 7 and the camera 6. In order to ensure the safety of the cashier, it is preferred that the computer 5 enables the cash register to dispense bills from the cash register into the tray 16, but the bills dispensed from the cash register under duress are most preferably marked by a special bill marker 60 which marks each bill dispensed under duress with invisible ink to facilitate capture and prosecution of the thief. Optionally, the bills may be dispensed from a special stack of previously marked bills, thereby eliminating the need for inclusion of a bill marker 60 in the cash register, but requiring each cash register to be provided with a special stack of marked bills.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. A method comprising:

depositing at least one bill having a serial number into a cash register;

optically scanning each bill as each bill is being deposited into the cash register;

identifying the serial number of each bill;

recording each serial number in a database;

dispensing at least one bill from the cash register in response to an input command; and updating the database of serial numbers to reflect each bill deposited into the cash register and each bill dispensed from the cash register.

2. The method of claim 1 further comprising:

identifying the denomination of each bill.

3. The method of claim 2, further comprising:

associating each bill deposited and each bill dispensed with a given transaction.

4. The method of claim 3, further comprising:

recording a product or service identification in the database in association with each transaction.

5. The method of claim 3, further comprising:

recording a purchaser identification code in the database in association with each given transaction.

6. The method of claim 5, further comprising:

transmitting a transaction report to an electronic address associated with the purchaser identification code.

7. The method of claim 6, wherein the transaction report comprises the net amount of bills deposited and the products or services associated with the transaction.

8. The method of claim 1, further comprising:

determining the net cash receipts into the register as bills deposited into the register less bills dispensed from the cash register.

9. The method of claim 8, further comprising:

providing the net cash receipts for use in an accounting program.

10. The method of claim 1, further comprising:

receiving a duress code into the cash register; and initiating a silent alarm signal.

11. The method of claim 10, further comprising:

identifying the serial numbers of each bill dispensed under duress.

12. The method of claim 10, further comprising:

marking an invisible ink onto each bill dispensed under duress.

13. The method of claim 1, further comprising:

determining whether each bill is counterfeit.

14. The method of claim 13, where the step of determining whether each bill is counterfeit includes a process selected from ultraviolet detection, watermark detection, magnetism detection, and combinations thereof.

15. The method of claim 1, further comprising:

comparing the serial number of each bill received with a database of serial numbers of stolen bills to determine if each bill received is stolen.

16. A method comprising:

maintaining a database representing the denomination of each bill received into a cash register;

identifying, using the cash register, an amount due to be paid by a purchaser for goods or services;

optically scanning a first bill deposited into the cash register;

determining the denomination of the first bill received into the cash register;

determining an amount of change due to the purchaser;

identifying from the database a second bill within the cash register having a denomination appropriate for dispensing as change;

dispensing the second bill from the cash register; and updating the database to reflect deposit of the first bill into the register and dispensing of the second bill from the register.

17. A computer program product comprising:

depositing instructions for depositing at least one bill having a serial number into a cash register;

scanning instructions for optically scanning each bill as it is being deposited into the cash register;

identifying instructions for identifying the serial number for each bill;

recording instructions for recording the serial numbers in a database;

dispensing instructions for dispensing at least one bill from the cash register in response to an input command; and updating instructions for updating the database of serial numbers to reflect each bill deposited into the cash register and each bill dispensed from the cash register.

18. The computer program product of claim 17 further comprising:

identifying instructions for identifying the denomination of each bill.

19. The computer program product of claim 18, further comprising:

associating instructions for associating each bill deposited and each bill dispensed with a given transaction.

20. The computer program product of claim 19, further comprising:

recording instructions for recording a product or service identification in the database in association with each transaction.

21. The computer program product of claim 19, further comprising:

recording instructions for recording a purchaser identification code in the database in association with each given transaction.

22. The computer program product of claim 21, further comprising:

transmitting instructions for transmitting a transaction report to an electronic address associated with the purchaser identification code.

23. The computer program product of claim 22, wherein the transaction report comprises the net amount of bills deposited and the products or services associated with the transaction.

24. The computer program product of claim 17, further comprising:

determining instructions for determining the net cash receipts into the register as bills deposited into the register less bills dispensed from the cash register.

25. The computer program product of claim 24, further comprising:

providing instructions for providing the net cash receipts for use in an accounting program.

26. The computer program product of claim 17, further comprising:

receiving instructions for receiving a duress code into the cash register; and initiating instructions for initiating a silent alarm signal.

27. The computer program product of claim 26, further comprising:

identifying instructions for identifying the serial numbers of each bill dispensed under duress.

28. The computer program product of claim 26, further comprising:

marking instructions for marking an invisible ink onto each bill dispensed under duress.

29. The computer program product of claim 17, further comprising:

determining instructions for determining whether each bill is counterfeit.

30. The computer program product of claim 29, where the determining instructions for determining whether each bill is counterfeit includes instructions selected from ultraviolet detection instructions, watermark detection instructions, magnetism detection instructions, and combinations thereof.

31. The computer program product of claim 16, further comprising:

comparing instructions for comparing the serial number of each bill received with a database of serial numbers of stolen bills to determine if each bills received is stolen.

32. A system for managing currency transactions comprising:

depositing means for depositing at least one bill having a serial number into a cash register;

scanning means for optically each bill as it is being deposited into a cash register;

identifying means for identifying the serial number for each bill;

recording means for recording the serial numbers in a database;

dispensing means for dispensing at least one bill from the cash register in response to an input command; and updating means for updating the database of serial numbers to reflect each bill deposited into and each bill dispensed from the cash register.

33. The system of claim 32, further comprising:

identifying means for identifying the denomination of each bill deposited.

34. The system of claim 33, further comprising:

associating means for associating each bill deposited and each bill dispensed with a given transaction.

35. The system of claim 34, further comprising:

recording means for recording a product or service identification in the database in association with each transaction.

36. The system of claim 34, further comprising:

recording means for recording a purchaser identification code in the database in association with each given transaction.

37. The system of claim 36, further comprising:

transmitting means for transmitting a transaction report to an electronic address associated with the purchaser identification code.

38. The system of claim 37, wherein the transaction report comprises the net amount of bills deposited and the products or services associated with the transaction.

39. The system of claim 32, further comprising:

determining means for determining the net cash receipts into the register as bills deposited into the register less bills dispensed from the cash register.

40. The system of claim 39, further comprising:

providing means for providing the net cash receipts for use in an accounting program.

41. The system of claim 32, further comprising:

receiving means for receiving a duress code into the cash register; and initiating means for initiating a silent alarm signal.

42. The system of claim 41, further comprising:

identifying means for identifying the serial numbers of each bill dispensed under duress.

43. The system of claim 41, further comprising:

marking means for marking an invisible ink onto each bill dispensed under duress.

44. The system of claim 32, further comprising:

determining means for determining whether each bill is counterfeit.

45. The system of claim 44, where the determining means for determining whether each bill is counterfeit includes means selected from ultraviolet detection means, watermark detection means, magnetism detection means, and combinations thereof.

46. The system of claim 32, further comprising:

comparing means for comparing the serial number of each bill deposited with a database of serial numbers of stolen bills to determine if each bill deposited is stolen.

* * * * *

UNITED STATES PATENT AND TRADEMARK OFFICE
CERTIFICATE OF CORRECTION

PATENT NO. : 6,550,671 B1
DATED : April 22, 2003
INVENTOR(S) : Brown et al.

It is certified that error appears in the above-identified patent and that said Letters Patent is hereby corrected as shown below:

Column 15,
Line 3, change "bills received" to -- bill received --; and
Line 9, after "scanning means for optically" insert -- scanning --.

Signed and Sealed this

Ninth Day of September, 2003

JAMES E. ROGAN
*Director of the United States Patent and Trademark Office*